(No Model.)
H. STERNKOPF, Jr.
BUNG STARTER.
No. 586,323. Patented July 13, 1897.
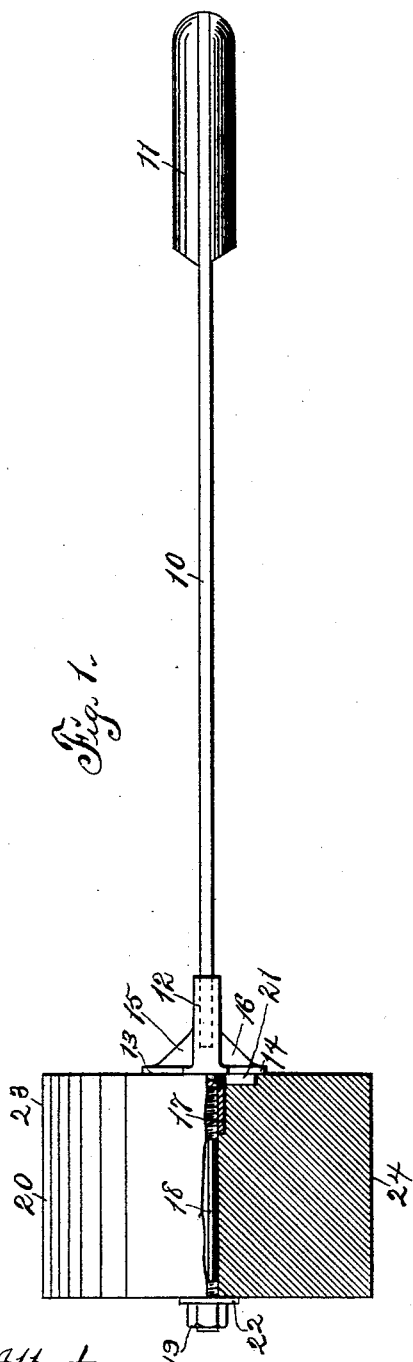
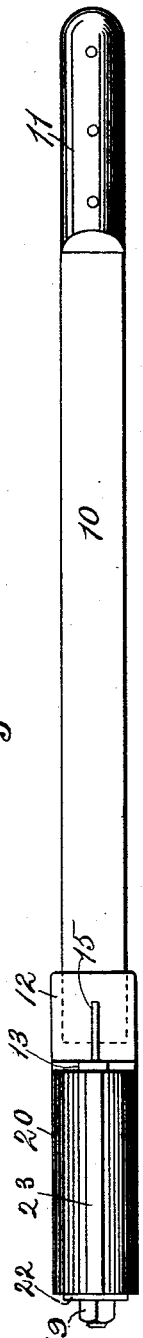
Attest:
S. C. Sweet
O. Schoff
Henry Sternkopf Jr.
H. F. O'Brien
atty.

UNITED STATES PATENT OFFICE.

HENRY STERNKOPF, JR., OF EAST ST. LOUIS, ILLINOIS.

BUNG-STARTER.

SPECIFICATION forming part of Letters Patent No. 586,323, dated July 13, 1897.

Application filed July 11, 1896. Serial No. 598,832. (No model.)

*To all whom it may concern:*

Be it known that I, HENRY STERNKOPF, Jr., a citizen of the United States, residing at East St. Louis, in the county of St. Clair and State of Illinois, have invented certain new and useful Improvements in Bung-Starters; and I do declare the following to be a full, clear, and exact description of the invention, such as will enable others skilled in the art to which it appertains to make and use the same, reference being had to the accompanying drawings, and to the figures of reference marked thereon, which form a part of this specification.

The object of this invention is to provide improved means for starting or withdrawing bungs from barrels, casks, kegs, and like receptacles.

This invention consists in the construction, arrangement, and combination of elements hereinafter more specifically described, claimed, and illustrated by the accompanying drawings, in which—

Figure 1 is a side elevation, partly in section, of the device. Fig. 2 is a plan of the device.

In the construction of the device as shown the numeral 10 designates a stem made of a bar of steel or similar flexible material, flexible in one direction only under ordinary conditions of use. To one end of the stem 10 is fixed a handle 11, whereby the tool may be manipulated. Fixed to the opposite end of the stem 10 from the handle 11 is a head 12, preferably cast of brass onto the stem, as shown by dotted lines in Fig. 1. The head 12 is provided with lateral flanges 13 14, extending upwardly and downwardly from the main portions thereof and braced by webs 15 16. A boss 17 is formed on and extends outwardly from the outer face of the head 12 in longitudinal alinement with the stem 10 and is interiorly screw-threaded to receive one of the screw-threaded ends of a shank 18, which shank extends longitudinally therefrom and is also screw-threaded at its other end to receive a nut 19. A starter-block 20, approximately elliptical in cross-section, is axially bored to receive the shank or bolt 18, said bore being enlarged at its inner end to receive the tubular boss 17. 21 are lugs on the outer face of the head, which engage in recesses in the inner end of the block 20, adjacent to the flanges 13 14 of the head 12, which lugs are formed on said flanges diametrically opposite each other and integrally connected to the boss 17. The starter-block 20 is clamped to the head and in engagement with the flanges and lugs thereof by the nut 19, screwed upon the outer end of the shank or bolt 18, and a washer 22 is interposed between said nut and the outer end of the block to provide a broad bearing thereon.

In practical use this device is employed manually in such a manner that the face 23 or face 24 of the block engages the staves of the cask, barrel, or keg adjacent to the bung therein, and repeated forcible impactions of the block with the staves results in a loosening and withdrawing of the bung. By making the stem 10 flexible in the plane of its movement the block 20 will rebound from the cask-staves immediately after the impact therewith, resulting in more efficient and satisfactory operation of the tool.

By the employment of the shank or bolt 18, traversing the block, and the head 12, having the lugs 21 engaging the block, and the nut 19, screwed upon the shank or bolt 18, the said block is retained against movement on the stem.

I consider the use of the tubular boss highly advantageous in a device of this character, not only because it serves as a socket to receive the inner threaded end of the shank, but more especially because, being integral with the head and entering for some distance into the bore of the block, which it fits closely, it serves in a large measure to resist the force of impact and to prevent the loosening of the block thereby; and it will be obvious that the flanges and lugs materially assist by their close contact with and entry into the body of the block under the tension of the nut.

It will be observed that the block is formed with flat faces bounding its longest diameter and at the points where contact or impaction is made upon a barrel, and that said faces are parallel to each other and equidistant from the stem, and also that the stem is fixed rigidly to the block. The construction last-above noted provides for equalizing the weight of or balancing the block on the stem, so that a blow may be struck a barrel with either flat face of the block, and, further, that the blow may be rendered more effective by using flat faces parallel with the stem with which to strike the barrel; otherwise, were the faces located in planes converging to the handles, each blow struck would tend to wrench the tool from the hand of the operator, thereby wasting a portion of the force of the blow and unduly tiring the user.

I claim—

The herein-described bung-starter consisting of a flexible stem having a handle 11 at one end and a head 12 at the other, flanges 13 and 14 extending from the upper and lower sides of the handle, bracing-webs 15 and 16 between said flanges and head on the inner face of the latter, an interiorly-threaded tubular boss 17 integral with and extending from the outer face of the head at right angles to the flanges and in line with the stem, lugs 21 also on the outer face of said head, a block 20 adapted to receive the lugs and having a central bore enlarged at its inner end to receive the boss so that the inner end of the block rests flat against the outer face of the head, a removable shank 18 passing through the bore and threaded at both ends, one of which engages with the threads of the boss, an independent and removable washer 22 surrounding the other end and resting against the outer end of the block and somewhat larger than its bore, and a nut 19 on said latter end adapted to hold the washer against the block and the parts in position, substantially as set forth.

In testimony whereof I affix my signature in presence of two witnesses.

HENRY STERNKOPF, JR.

Witnesses:
HENRY STERNKOPF, SR.,
CLARA STERNKOPF.